United States Patent
Manweiler et al.

(10) Patent No.: US 8,356,824 B1
(45) Date of Patent: Jan. 22, 2013

(54) STROLLER ILLUMINATION SYSTEM

(76) Inventors: Randal J. Manweiler, Denver, CO (US);
Michael T. Coon, Denver, CO (US)

( * ) Notice: Subject to any disclaimer, the term of this patent is extended or adjusted under 35 U.S.C. 154(b) by 338 days.

(21) Appl. No.: 12/731,863

(22) Filed: Mar. 25, 2010

(51) Int. Cl.
*B62D 39/00* (2006.01)
*B62D 7/00* (2006.01)
*B62D 1/00* (2006.01)

(52) U.S. Cl. ............... 280/33.992; 280/47.38; 280/647
(58) Field of Classification Search ............ 280/47.38, 280/647, 33.992
See application file for complete search history.

(56) References Cited

U.S. PATENT DOCUMENTS

| | | | |
|---|---|---|---|
| 4,896,894 A | 1/1990 | Singletary | |
| 5,029,891 A | 7/1991 | Jacobs | |
| 5,158,310 A * | 10/1992 | Tannehill et al. | 280/33.992 |
| 5,677,790 A | 10/1997 | Taglieri | |
| 5,806,924 A | 9/1998 | Gonas | |
| 5,937,961 A * | 8/1999 | Davidson | 180/166 |
| 5,938,216 A * | 8/1999 | Weng | 280/47.38 |
| D428,366 S | 7/2000 | Schmidt | |
| 6,394,633 B1 * | 5/2002 | Perez | 280/647 |
| 6,558,018 B1 * | 5/2003 | Blum | 362/183 |
| 6,906,472 B2 | 6/2005 | Wong | |
| 7,350,607 B2 * | 4/2008 | Park et al. | 180/65.51 |
| 7,407,178 B2 * | 8/2008 | Freedman | 280/642 |
| 7,997,775 B2 * | 8/2011 | Hurwitz | 362/474 |
| 8,025,433 B2 * | 9/2011 | Comrada | 362/543 |
| 2008/0084040 A1 * | 4/2008 | McGowan | 280/47.38 |
| 2008/0211206 A1 * | 9/2008 | Thorne et al. | 280/650 |
| 2009/0244916 A1 * | 10/2009 | Conwell et al. | 362/464 |
| 2010/0045209 A1 * | 2/2010 | Daley et al. | 362/184 |

* cited by examiner

*Primary Examiner* — J. Allen Shriver, III
*Assistant Examiner* — James M Dolak

(57) ABSTRACT

A stroller illumination system includes a stroller frame and a child receiving member that is mounted on the stroller frame. The stroller frame includes a plurality of legs and a handle grip. Each of the legs has at least one of a plurality of wheels rotatably coupled thereto. A light emitting assembly is mounted on the frame. The light emitting assembly emits light when turned on to increase a visibility of the stroller frame.

4 Claims, 3 Drawing Sheets

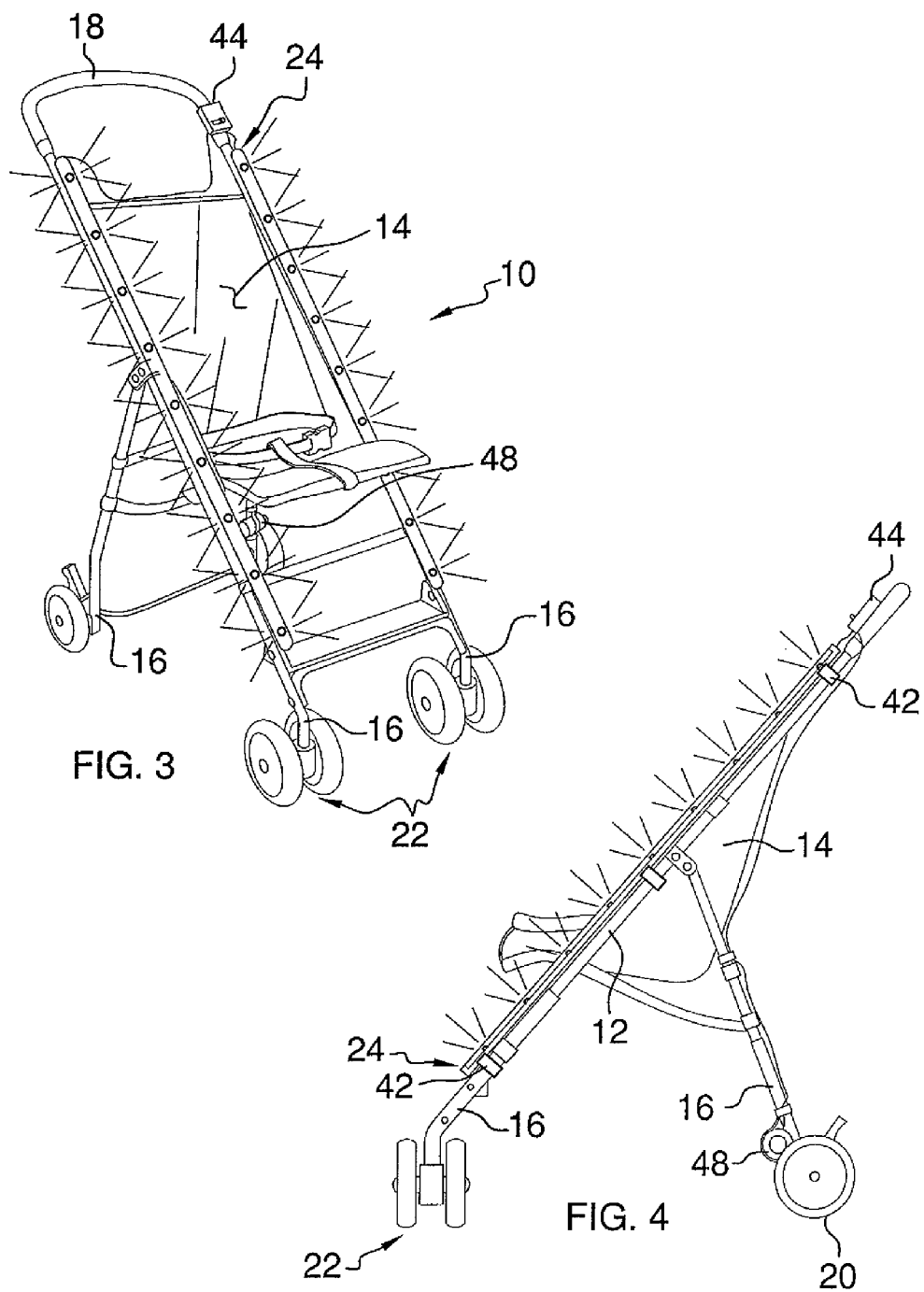

STROLLER ILLUMINATION SYSTEM

BACKGROUND OF THE DISCLOSURE

Field of the Disclosure

The disclosure relates to stroller illumination devices and more particularly pertains to a new stroller illumination device for increasing the visibility of a stroller during low light conditions.

SUMMARY OF THE DISCLOSURE

An embodiment of the disclosure meets the needs presented above by generally comprising a stroller frame and a child receiving member that is mounted on the stroller frame. The stroller frame includes a plurality of legs and a handle grip. Each of the legs has at least one of a plurality of wheels rotatably coupled thereto. A light emitting assembly is mounted on the frame. The light emitting assembly emits light when turned on to increase a visibility of the stroller frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a front in-use view of an embodiment of the disclosure.

FIG. 4 is a side in-use view of an embodiment of the disclosure.

DESCRIPTION OF THE PREFERRED EMBODIMENT

Figure 1:
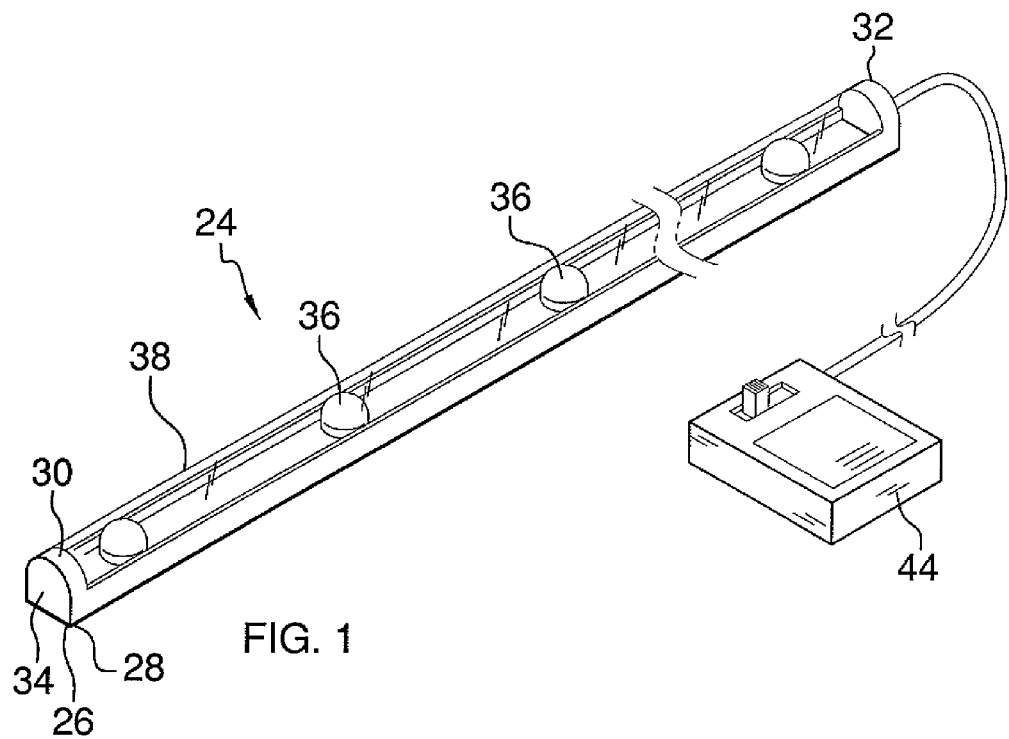
FIG. 1 is a broken top perspective view of a stroller illumination system according to an embodiment of the disclosure.

With reference now to the drawings, and in particular to FIGS. 1 through 6 thereof, a new stroller illumination device embodying the principles and concepts of an embodiment of the disclosure and generally designated by the reference numeral 10 will be described.

As best illustrated in FIGS. 1 through 6, the stroller illumination system 10 generally comprises a stroller frame 12 and a child receiving member 14 that is mounted on the stroller frame 12. The child receiving member 14 is seat of conventional construction. The stroller frame 12 includes a plurality of legs 16 and a handle grip 18. A plurality of wheels 20 is provided. Each of the legs 16 has at least one of the wheels 20, 22 rotatably coupled thereto. In general, the stroller frame 12 and its attachments combine to form a conventional stroller assembly.

Figure 2:
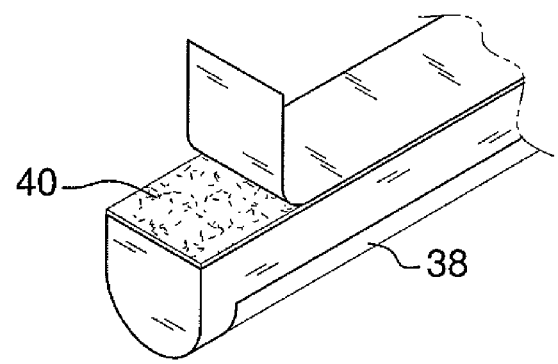
FIG. 2 is a broken and bottom perspective view of an embodiment of the disclosure.
Figure 5:
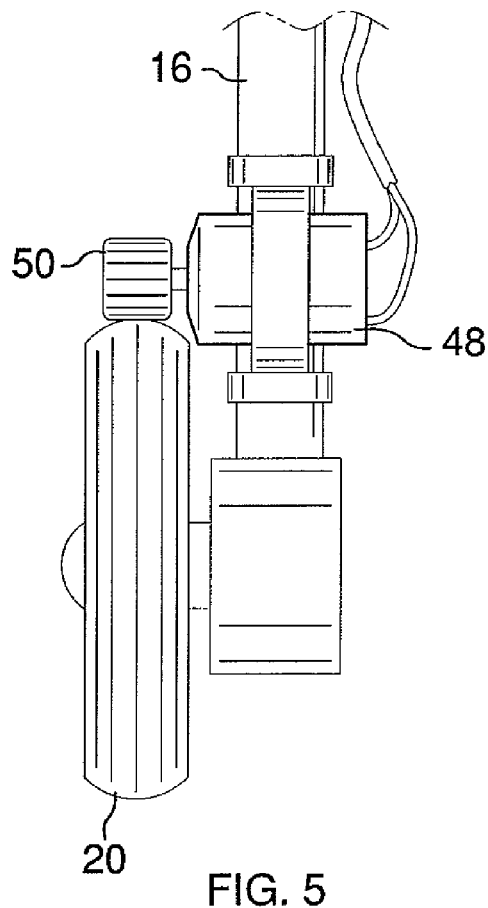
FIG. 5 is a broken rear view of an embodiment of the disclosure.
Figure 6:
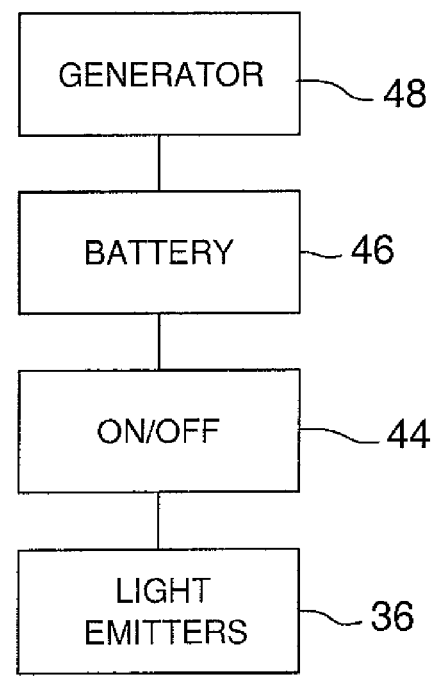
FIG. 6 is a schematic box diagram of an embodiment of the disclosure.

A light emitting assembly 24 is mounted on the frame 12. The light emitting assembly 24 emits light when turned on to increase a visibility of the stroller frame 12. The light emitting assembly 24 includes a housing 26 that has a back side 28 and a front side 30. The housing 26 also has a first end 32 and a second end 34 and is elongated from the first end 32 to the second end 34. A plurality of light emitters 36 is mounted on the front side 30. The light emitters 36 may comprise light emitting diodes which may produce either a white or a colored light. A covering 38 is mounted to the housing 26 and covers the light emitters 36. The covering 38 comprises a translucent material. A securing member is mounted on the housing and secures the housing 26 to the stroller frame 12. The securing member may include an adhesive 40 attached to the back side 28 of the housing 12 as shown in FIG. 2. Alternatively, or in addition to the adhesive 40, the securing member may include a plurality of straps 42 attached to the housing 26 and extended around the stroller frame 12. An actuator 44 is electrically coupled to the light emitters 36 to selectively turn the light emitters 36 on or off.

A power supply 46 is electrically coupled to the light emitting assembly 24. The power supply 46 comprises at least one rechargeable battery. An electric generator 48 is mounted on the stroller frame 12 and is in mechanical communication with a first wheel 20 of the plurality of wheels 20, 22 by way of a gear 50 mounted to be in contact with the first wheel 20. The generator 48 is electrically coupled to the power supply 46 to recharge the at least one rechargeable battery. The generator 48 is actuated and produces electricity when the first wheel 20 is rotated. Alternatively, the generator 48 may be used to directly power the light emitters 36.

In use, the light emitting assembly 24 is mounted on the stroller frame 12. As can be seen in the Figures, more than one light emitting assembly 24 may be used and they may share the power supply 46. The light emitting assembly 24 is turned on during low light conditions to ensure that others can readily see the stroller frame 12 to increase the safety of a child seated therein.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A stroller lighting system including:
   a stroller frame and a child receiving member being mounted on said stroller frame, said stroller frame including a plurality of legs and a handle grip;
   a plurality of wheels, each of said legs having at least one of said wheels rotatably coupled thereto;

a light emitting assembly being mounted on said frame, said light emitting assembly emitting light when turned on to increase a visibility of said stroller frame;

a power supply being electrically coupled to said light emitting assembly, said power supply comprising at least one rechargeable battery; and an electric generator being mounted on said stroller frame adjacent to a first wheel of said plurality of wheels, said electrical generator having a shaft extending from said stroller frame when said electrical generator is mounted on said stroller frame, said shaft extending towards said first wheel, a perimeter edge of a gear coupled to said shaft frictionally engaging an outer perimeter of said first wheel whereby rotation of said first wheel rotates said gear to turn said shaft and actuate said electrical generator to produce electricity, said generator being electrically coupled to said power supply to recharge said at least one rechargeable battery when said electrical generator is actuated.

2. The system according to claim 1, wherein said light emitting assembly includes:

a housing having a back side and a front side, said housing having a first end and a second end and being elongated from said first end to said second end;

a plurality of light emitters being mounted on said front side;

a covering being mounted to said housing and covering said light emitters, said covering comprising a translucent material;

a securing member being mounted on said housing and securing said housing to said stroller frame; and an actuator being electrically coupled to said light emitters to selectively turn said light emitters on or off.

3. A stroller lighting system including:

a stroller frame and a child receiving member being mounted on said stroller frame, said stroller frame including a plurality of legs and a handle grip;

a plurality of wheels, each of said legs having at least one of said wheels rotatably coupled thereto;

a light emitting assembly being mounted on said frame, said light emitting assembly emitting light when turned on to increase a visibility of said stroller frame, said light emitting assembly including;

a housing having a back side and a front side, said housing having a first end and a second end and being elongated from said first end to said second end;

a plurality of light emitters being mounted on said front side;

a covering being mounted to said housing and covering said light emitters, said covering comprising a translucent material;

a securing member being mounted on said housing and securing said housing to said stroller frame;

an actuator being electrically coupled to said light emitters to selectively turn said light emitters on or off;

a power supply being electrically coupled to said light emitting assembly, said power supply comprising at least one rechargeable battery; and an electric generator being mounted on said stroller frame adjacent to a first wheel of said plurality of wheels, said electrical generator having a shaft extending from said stroller frame when said electrical generator is mounted on said stroller frame, said shaft extending towards said first wheel, a perimeter edge of a gear coupled to said shaft frictionally engaging an outer perimeter of said first wheel whereby rotation of said first wheel rotates said gear to turn said shaft and actuate said electrical generator to produce electricity, said generator being electrically coupled to said power supply to recharge said at least one rechargeable battery when said electrical generator is actuated.

4. A stroller mountable lighting apparatus for mounting on a stroller frame and engaging one of a plurality of wheels of the stroller, said apparatus including:

a light emitting assembly being mountable on the stroller frame, said light emitting assembly emitting light when turned on to increase a visibility of said stroller frame, said light emitting assembly including;

a housing having a back side and a front side, said housing having a first end and a second end and being elongated from said first end to said second end;

a plurality of light emitters being mounted on said front side;

a covering being mounted to said housing and covering said light emitters, said covering comprising a translucent material;

a securing member being mounted on said housing and configured to secure said housing to the stroller frame;

an actuator being electrically coupled to said light emitters to selectively turn said light emitters on or off;

a power supply being electrically coupled to said light emitting assembly, said power supply comprising at least one rechargeable battery; and an electric generator being mounted on said stroller frame adjacent to a first wheel of said plurality of wheels, said electrical generator having a shaft extending from said stroller frame when said electrical generator is mounted on said stroller frame, said shaft extending towards said first wheel, a perimeter edge of a gear coupled to said shaft frictionally engaging an outer perimeter of said first wheel whereby rotation of said first wheel rotates said gear to turn said shaft and actuate said electrical generator to produce electricity, said generator being electrically coupled to said power supply to recharge said at least one rechargeable battery when said electrical generator is actuated.

* * * * *